(No Model.) 3 Sheets—Sheet 2.

R. H. PLASS.
SELF PROPELLING VEHICLE.

No. 571,392. Patented Nov. 17, 1896.

Witnesses
M. Kelly
F. D. Berry

Inventor
Reuben H. Plass
By David H. Mead
Attorney (No Model.) 3 Sheets—Sheet 3.
R. H. PLASS.
SELF PROPELLING VEHICLE.
No. 571,392. Patented Nov. 17, 1896.
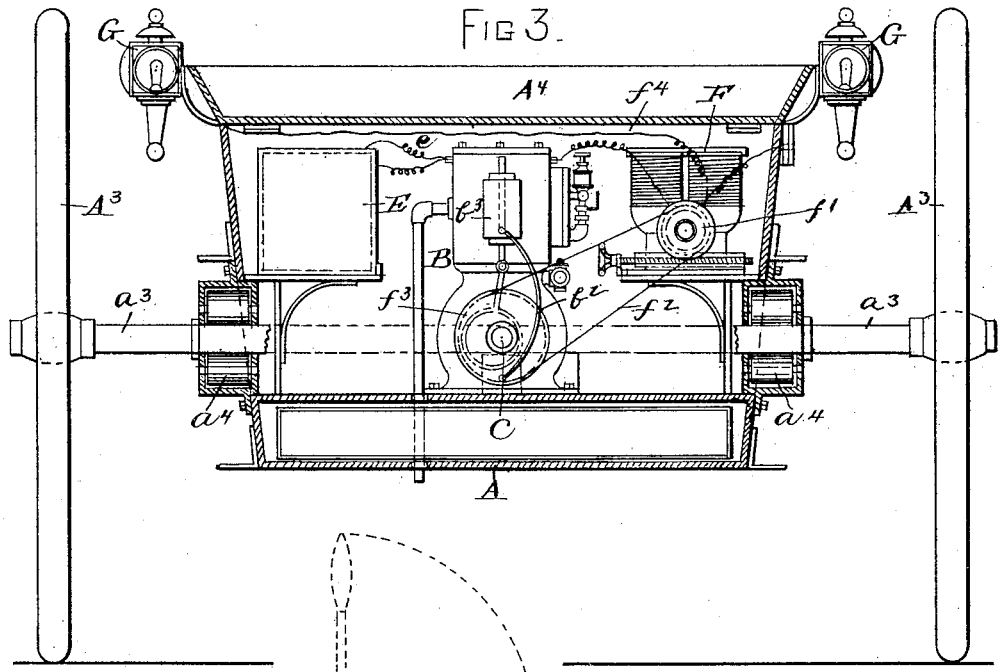
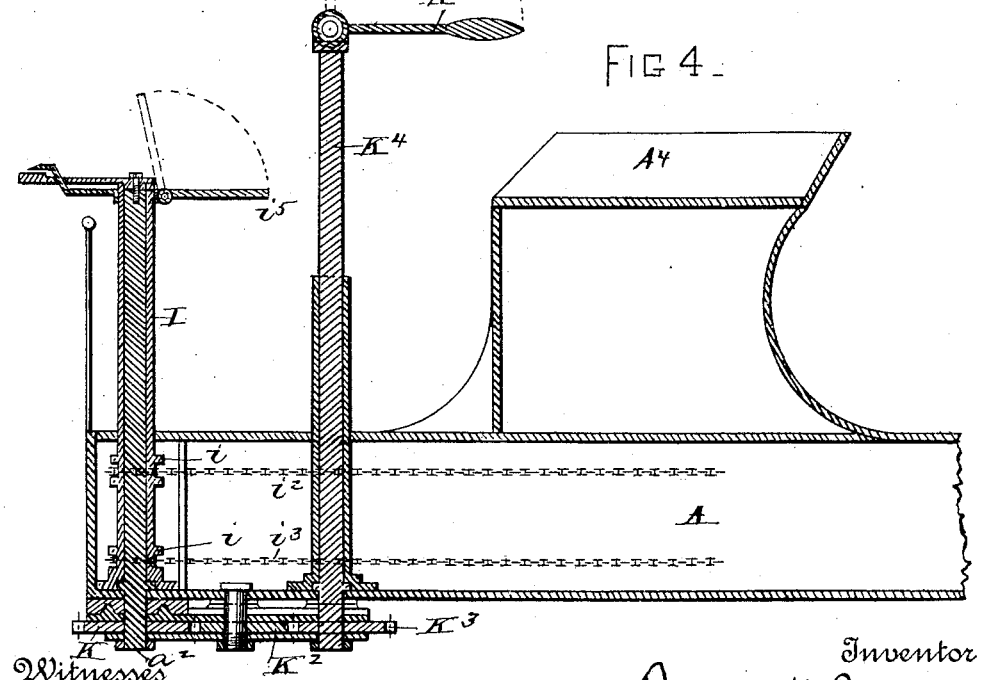
Witnesses
M. Kelly
F. D. Berry
Inventor
Reuben H. Plass
By David H. Mead
Attorney

United States Patent Office.

REUBEN H. PLASS, OF BROOKLYN, NEW YORK.

SELF-PROPELLING VEHICLE.

SPECIFICATION forming part of Letters Patent No. 571,392, dated November 17, 1896.

Application filed April 20, 1895. Serial No. 546,559. (No model.)

*To all whom it may concern:*

Be it known that I, REUBEN H. PLASS, a citizen of the United States, residing at Brooklyn, in the county of Kings and State of New York, have invented certain new and useful Improvements in Self-Propelling Vehicles; and I do hereby declare the following to be a full, clear, and exact description of the invention, such as will enable others skilled in the art to which it appertains to make and use the same.

This invention relates to that class of vehicles which are driven by a motor or engine, wherein the motor or engine and the material for operating the same are carried by the vehicle.

The object of the invention is to provide a light, simple, easily-controlled, and noiseless vehicle provided with such means for propelling and steering that it may be run at varying speeds, stopped and started, and guided by an unskilled person with safety and ease.

Further, the object is to provide a vehicle of the kind referred to so constructed that the necessary supply of material for operating the propelling device for a long distance may be carried without inconvenience to the passengers.

Further, the object of the invention is to provide a vehicle having a suitable source of power, such as a gasolene-engine, and with such means for connecting the motor with the driving-wheels that the motor may be run at a uniform speed and the speed of running the vehicle may be varied by a simple means easily operated by an unskilled person.

Further, the object of the invention is to produce a vehicle driven by a motor or engine carried by the same, wherein the power for propelling is transmitted from the motor or engine to the driving-wheels with the intervention of a small number of parts, thus avoiding loss of power by friction or slipping, and in which the controlling of the direction of movement and of the speed of the movement is regulated by means of a lever or the like connected with the driving mechanism and placed in a suitable position to be reached by a passenger.

The invention consists of the novel construction and arrangement of parts, substantially as herein set forth and claimed.

The invention is illustrated in the accompanying drawings, in which—

Figure 1:
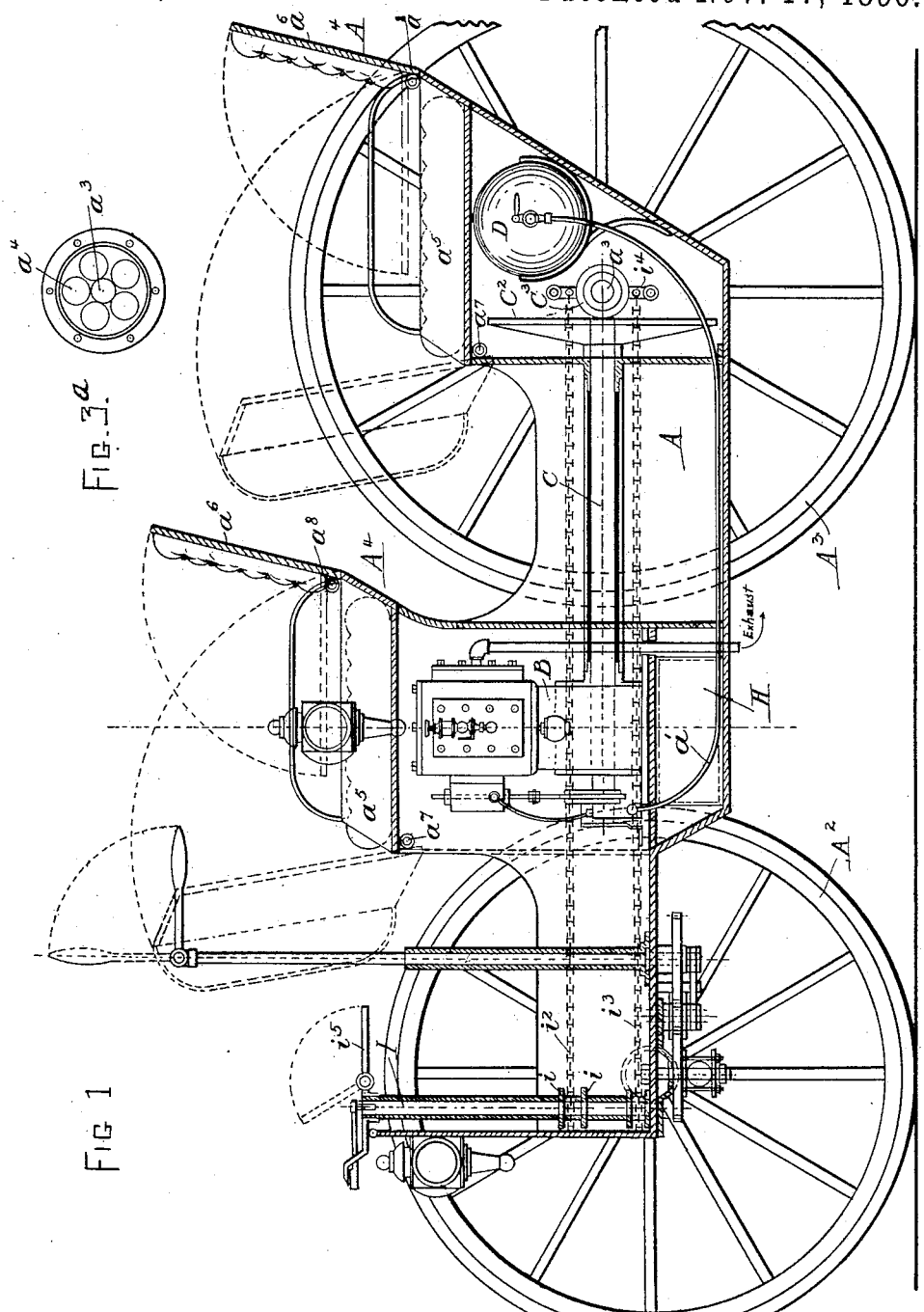
Figure 2:
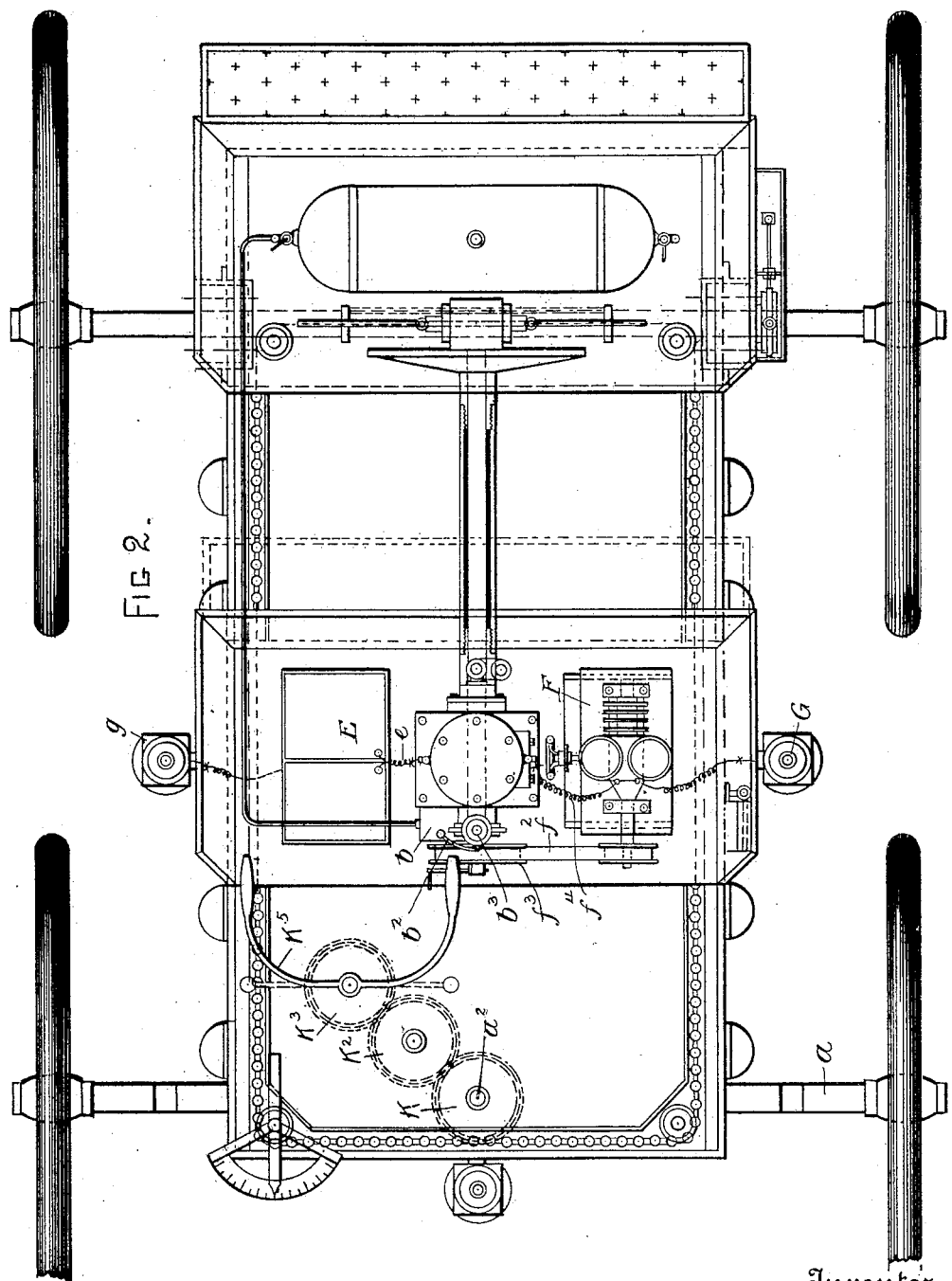

Figure 1 is a side view of the vehicle, the side of the body being removed. Fig. 2 is a plan view, the seats being removed. Fig. 3$^a$ is a detail view showing the bearings for the axles of the driving-wheels. Fig. 3 is a transverse sectional view particularly showing the arrangement of a gasolene, naphtha, or other similar engine and the electrical means for igniting the hydrocarbon in the engine and providing lights for the lamps of the vehicle; and Fig. 4 is a sectional view showing the steering device and a portion of the means for starting, stopping, and varying the speed and direction of movement of the vehicle.

In the drawings, A represents the main body of the vehicle, which in the present embodiment of the invention is shown as two-seated and mounted on four wheels. It will be clear from an understanding of the invention that a vehicle with any number of wheels may be employed, and that the invention is particularly adapted by slight modifications for application to bicycles and tricycles as commonly constructed.

In the present illustration the vehicle is shown as mounted on two sets of wheels $A^2$ and $A^3$. The front set $A^2$ is connected to the body of the vehicle by an axle $a$ and the king-bolt $a^2$, and the wheels of the back set are connected to an axle $a^3$, mounted in suitable bearings fixed to the rear of the body A. The bearings of the axle $a^3$ are preferably provided with a series of antifriction-rollers $a^4$, as shown in Fig. 3 of the drawings, to avoid friction on the axles.

The seats $A^4$ of the vehicle are preferably, as shown, composed of two hinged or pivoted sections $a^5$ $a^6$, the section $a^5$ being pivoted at a point $a^7$ to the body of the vehicle and the two sections $a^5$ $a^6$ being pivotally connected at a point $a^8$. This arrangement permits of the seats being folded compactly together and of being raised to permit free access to the space beneath the seats, where the principal working and movable parts of the propelling and controlling device are arranged.

Arranged under the front seat is an engine or motor B, by which a rotary movement is given the main driving-shaft C. The engine shown is a gas-engine, and the gas used to supply it is generated from naphtha, gasolene, or other suitable hydrocarbon contained in a tank D, located beneath the rear seat. The hydrocarbon used is conducted from the tank D to the engine B by a pipe $a$, which leads to a reservoir $b$, connected by a pipe $b^2$ with a pump $b^3$, by which the hydrocarbon is forced, together with a sufficient quantity of air, into the engine at proper times.

The explosion of the hydrocarbon in the engine is effected by sparks caused by making and breaking an electric circuit, the current of which is supplied by a battery E, arranged adjacent to the engine and having wires $e$ extending from the battery to the cylinder of the engine.

A dynamo F is mounted near the engine and receives motion from the band-wheel $f'$, which is connected by a belt $f^2$ with a band-wheel $f^3$ on the shaft of the engine. The conductors from the dynamo are connected to incandescent lamps G, arranged on each side of the front seat of the vehicle, and they are also connected by conductors $f^4$ with the explosion-chamber of the engine. By this arrangement it will be seen that in case of the weakening or disconnection of the battery E the current generated by the dynamo may be utilized to provide the necessary sparks for igniting the hydrocarbon in the engine.

Beneath the engine B is a water-tank H, containing a supply of water, which is caused to circulate around the cylinder of the engine for the purpose of keeping it cool. Motion is transmitted from the main driving-shaft C to the rear axle $a^3$ of the vehicle through the friction-plate $C^2$, fixed to the rear of the shaft C, and a friction-roller $C^3$, mounted on the rear axle. This friction-roller is connected to the rear axle by a spline or feather or in any other suitable way which will permit of its sliding longitudinally on the shaft and which at the same time will cause the friction-roller and the shaft to rotate together.

The rear face of the friction-plate $C^2$ is preferably concave and is coated with some material, such as rubber, which will cause the disk and roller to turn together when brought into contact. The rear face of the friction-plate $C^2$ being concave it will be seen that by placing the friction-roller opposite the center of the plate the latter is capable of rotating without giving motion to the roller. The direction of rotation of the friction-roller, and consequently of the rear axle by which the vehicle is driven, is regulated by the position in which the roller is placed relative to the friction-disk. By moving the friction-roller to come into contact with the disk at one side of its axis the vehicle will be caused to move in one direction, while by moving the friction-roller to the other side the movement will be reversed. It will also be seen that the greater the distance the friction-roller is moved from the center of the disk the greater will be the speed of revolution of the axle.

In order to place the adjustment of the friction-roller $C^3$ within the ready control of the occupants of the vehicle, I provide in the front of the vehicle an upright shaft I, provided with guide projections $i$. Around the shaft I pass two chains or belts $i^2\ i^3$, which are connected, respectively, at the upper and lower ends of bars $i^4$, which are attached to the friction-roller $C^3$. The shaft I is provided with a handle $i^5$, by which the shaft may be rotated, so that by turning the shaft the position of the friction-roller relative to the friction-plate may be regulated.

The vehicle is steered by means of the gears K, $K^2$, and $K^3$, which are arranged beneath the floor of the vehicle. The gear K is rigidly attached to the king-bolt $a^2$. The gear $K^3$ is attached at the lower end of the shaft $K^4$, provided with a handle $K^5$, within easy reach of the occupant of the front seat of the vehicle. The gear $K^2$ is interposed between and is in contact with the gears K and $K^3$. By the arrangement described the turning of the handle $K^5$ in either direction will result in a corresponding movement of the king-bolt and consequently of the front axle, to which the king-bolt is rigidly attached, and there will be sufficient friction between the three gears to prevent displacement of the axle by the wheels coming into contact with obstruction or unevenness in road.

Having thus described my invention, what I claim as new, and desire to secure by Letters Patent, is—

1. A self-propelling vehicle comprising an axle having a longitudinally-movable roller connected therewith in a manner to rotate with it, an engine arranged on approximately the same plane as the axle, the engine being provided with a shaft having its end arranged adjacent to the axle, and a friction-plate on the shaft designed to be engaged by the roller, substantially as described.

2. In a self-propelling vehicle, the combination with the king-bolt having a gear-wheel attached thereto of a standard provided with a handle at its upper end and with a gear-wheel at its lower end, and a gear-wheel interposed between and meshing with those on the king-bolt and standard, substantially as described.

In testimony whereof I affix my signature in presence of two witnesses.

REUBEN H. PLASS.

Witnesses:
THOS. S. HOPKINS,
F. H. SMITH.